Patented Nov. 18, 1952

2,618,600

UNITED STATES PATENT OFFICE 2,618,600

SILICONE OIL LUBRICATING COMPOSITION

Douglas H. Moreton, Pacific Palisades, Calif., assignor to Douglas Aircraft Company, Inc., Santa Monica, Calif.

No Drawing. Application July 15, 1948, Serial No. 38,952

12 Claims. (Cl. 252—49.9)

This invention relates to a method of improving the lubricating properties of a silicone oil or fluid and to the resulting new composition of matter.

Silicone oils or fluids are synthetic relatively high molecular weight liquids, the molecules of which have a skeleton structure of alternating silicon and oxygen atoms bonded one to another with hydrocarbon groups attached to silicon atoms. Silicone oils or fluids may also be regarded as the liquid silicone polymers or polymeric organosiloxanes. These silicone oils or fluids are known and are amply described in the literature, particularly in the following publications: Chemistry of the Silicones, by Eugene G. Rochow, published by John Wiley & Sons, Inc., particularly chapter 4, methyl silicone oil is described on pages 64 to 70; Silicone Oils, part I: Their Properties, General Electric Review, November 1946, vol. 49, No. 11, pages 14–18, part II: Their Applications, General Electric Review, December 1946, vol. 49, No. 12, pages 28–33, both articles by Dr. Donald F. Wilcock; Silicone Lubricants, by T. A. Kauppi and W. W. Pedersen, Lubrication Engineering, December 1946, vol. 2, No. 4, page 158, and February–March 1947, vol. 3, No. 1, page 17; Dimethyl-Silicone-Polymer Fluids and Their Performance Characteristics in Hydraulic Systems, by V. G. Fitzsimmons, D. L. Pickett, R. O. Militz, and W. A. Zisman, in Transactions of the A. S. M. E. for May 1946, page 361; Dimethyl-Silicone-Polymer Fluids and Their Performance Characteristics in Unilaterally Loaded Journal Bearings, by J. E. Brophy, R. O. Militz, and W. A. Zisman, in Transactions of the A. S. M. E. for May 1946, page 355, and in references cited therein.

It is well known that such silicone oils or liquid silicone polymers have many properties which make them exceedingly desirable as lubricants. These properties particularly include the relatively small change in viscosity with temperature, especially over a wide range of temperature, high chemical stability even at relatively high temperatures, chemical inertness and unreactivity, low pour point, resistance to shear breakdown, low vapor pressure (especially with volatile fractions removed), high resistance to combustion, inertness toward available natural and synthetic rubbers, and, where the oil contains branched chain molecules by introducing trifunctional groups into the composition before equilibration, the oils have both very low pour points and high reluctance to crystallize or solidify, giving them very desirable low temperature properties. However, it is also known that silicone fluids are lacking in lubricating properties, particularly with respect to extreme pressure and load-carrying capacity, so that in applications involving high rubbing speeds or high unit bearing pressures the results are undesirable. In fact, some silicone oils fail as satisfactory lubricants at pressures somewhat lower than those ordinarily considered to be the initial stages of the extreme pressure range. Such lack of lubricity or oiliness of the silicone fluids, particularly the dimethyl silicone polymer fluids, is especially noticeable where both the loaded surfaces are ferrous, such as steel on steel and steel on cast iron.

It has now been discovered in accordance with my invention that the lubricating properties of such silicone polymer fluids can be substantially improved by the incorporation therewith of a suitable monoalkyl diaryl phosphate which by itself is insoluble or incompatible with the silicone fluid but which is rendered soluble or compatible therewith by means of a suitable trialkyl phosphate.

Certain monalkyl diaryl phosphates have highly desirable lubricating properties, particularly such lubricating properties in which the silicone fluids are lacking and it would be desirable to impart to the silicone oils the lubricating properties of such phosphates. Due to the incompatibility or insolubility of such monoalkyl diaryl phosphates in the silicone fluids, this cannot be done. It is a significant discovery of this invention, however, that desirable lubricating properties of such monalkyl diaryl phosphates can be imparted to silicone fluids by means of a trialkyl phosphate, such as trioctyl phosphate, which functions as a solubilizing agent or as an agent which renders the incompatible phosphate compatible with the silicone oil or fluid. It is also a significant feature of this invention that the resulting composition is more fire-resistant than the composition resulting from the use of trioctyl phosphate alone as the lubricity improving agent, as disclosed and claimed in my copending application, Serial No. 165,868, filed June 2, 1950. In other words, the discovery, in accordance with this invention, that certain monalkyl diaryl phosphates can be rendered soluble or compatible with silicone oils or fluids by means of a small proportion of certain trialkyl phosphates, makes it possible to take advantage not only of the desirable lubricating properties of the monoalkyl diaryl phosphates but also of their fire-resistant properties.

The monoalkyl diaryl phosphates suitable for the purposes of my invention in general include those which may be represented by the following formula:

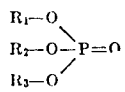

where $R_1$ may be phenyl, cresyl, or xylyl, $R_2$ may be phenyl, cresyl, or xylyl, and $R_3$ may be an alkyl radical having from about 4 to 10 carbon atoms, preferably iso-alkyl or branched chain and still more preferably where the iso-alkyl radical has at least two branches in the chain.

By way of exemplification, such phosphates particularly include butyl diphenyl, butyl dicresyl, butyl phenyl cresyl, butyl dixylyl, amyl diphenyl, amyl dicresyl, amyl phenyl cresyl, amyl dixylyl, hexyl diphenyl, hexyl dicresyl, hexyl phenyl cresyl, hexyl dixylyl, heptyl diphenyl, heptyl dicresyl, heptyl phenyl cresyl, heptyl dixylyl, octyl diphenyl, octyl dicresyl, octyl phenyl cresyl, octyl dixylyl, nonyl diphenyl, nonyl dicresyl, nonyl phenyl cresyl, nonyl dixylyl, decyl diphenyl, decyl dicresyl, decyl phenyl cresyl, decyl dixylyl, iso-butyl diphenyl, iso-butyl dicresyl, iso-butyl phenyl cresyl, iso-butyl dixylyl, iso-amyl diphenyl, iso-amyl dicresyl, iso-amyl phenyl cresyl, iso-amyl dixylyl, iso-hexyl diphenyl, iso-hexyl dicresyl, iso-hexyl phenyl cresyl, iso-hexyl dixylyl, iso-octyl diphenyl, iso-octyl dicresyl, iso-octyl phenyl cresyl, iso-octyl dixylyl, iso-nonyl diphenyl, iso-nonyl dicresyl, iso-nonyl phenyl cresyl, iso-nonyl dixylyl, iso-decyl diphenyl, iso-decyl dicresyl, iso-decyl phenyl cresyl, iso-decyl dixylyl, iso-heptyl diphenyl, iso-heptyl dicresyl, iso-heptyl phenyl cresyl, iso-heptyl dixylyl, particularly including the foregoing iso-octyl compounds wherein the iso-octyl radical is ethyl hexyl, for example, 2-ethyl hexyl and methyl heptyl, for example, 6-methyl heptyl and the iso-nonyl compounds wherein the iso-nonyl radical is $Me_3C.CH_2(CH.CH_3)CH_2.CH_2-$. As used herein the term "cresyl" indicates the tolyl or methylphenyl radical and "xylyl" the dimethylphenyl radical. The cresyl radical may be derived from ortho, meta or para cresol or mixtures thereof, but is usually derived from a mixture of predominantly metal and para isomers.

The trialkyl phosphates suitable for the purposes of my invention, that is, for rendering the insoluble or incompatible monoalkyl diaryl phosphates soluble or compatible with the silicone oil or fluids include those trialkyl phosphates in which the alkyl radicals have from about 4 to 10 carbon atoms, preferably where such alkyl radicals are iso-alkyl or branched chain and still more preferably where the iso-alkyl radical has at least two branches to the chain.

By way of exemplification, such trialkyl phosphates include tributyl, triamyl, trihexyl, triheptyl, trioctyl, trinonyl, tridecyl, tri-iso-butyl, tri-iso-amyl, tri-iso-hexyl, tri-iso-heptyl, tri-iso-octyl, tri-iso-nonyl, tri-iso-decyl, particularly including tri(2-ethyl hexyl), tri(6-methyl heptyl) and the tri-iso-nonyl where the iso-nonyl radical is represented by the formula $$Me_3C.CH_2(CH.CH_3)CH_2.CH_2-$$

The following examples will illustrate my invention:

*Example 1*

A composition in accordance with my invention was made up as follows:

60% by volume dimethyl silicone polymer (1981-LT-NV-20)

10% iso-nonyl diphenyl phosphate
30% tri-(2-ethyl hexyl) phosphate

The iso-nonyl diphenyl phosphate, which alone is insoluble in the dimethyl silicone polymer, was rendered soluble therein by means of the tri(2-ethyl hexyl) phosphate. The resulting solution was made by mixing the three components at room temperature. The resulting composition had improved load-carrying and extreme pressure properties with respect to the dimethyl silicone oil alone, and its fire-resistance was better than that of the composition using 40% tri(2-ethyl hexyl) phosphate. The iso-nonyl radical of the iso-nonyl diphenyl phosphate may be represented by the probable formula $$Me_3C.CH_2(CH.CH_3)CH_2.CH_2-$$

The dimethyl silicone polymer or methyl silicone oil was obtained from the General Electric Company, Schenectady, New York, under its trade designation 9981-LT-NV-20. It is a methylpolysiloxane liquid containing linear methylpolysiloxanes having molecules of finite length. This and similar silicone oils are described in the trade publication of the General Electric Company, Resin and Insulation Materials Division—Chemical Department, Schenectady, N. Y., entitled "A Comparative Study of G-E Silicone Oils and Petroleum Oils in Hydraulic Applications" and supplemental sheet entitled "Available G-E Silicone Oils." The letters "LT" indicate a silicone oil having extremely low temperature properties. Such a silicone oil is particularly referred to on the third page of the article "Silicone Oils, part I; Their Properties' by Dr. Donald F. Wilcock, General Electric Review, November 1946, in the second paragraph under the heading "Physical Properties" and in the articles by D. F. Wilcock in The Journal of the American Chemical Society, vol. 68, 1946. The letters "NV" indicate that volatiles have been removed, particularly the small molecules, by vacuum distillation as a step in their manufacture. The numeral "20" indicates the viscosity in centistokes at 100° F

*Example 2*

60% by volume dimethyl silicone polymer (9981-LT-NV-20)

10% 2-ethyl hexyl dicresyl phosphate
30% tri(2-ethyl hexyl) phosphate

The 2-ethyl hexyl dicresyl phosphate which by itself is insoluble in the methyl silicone oil was rendered soluble therein by means of the tri(2-ethyl hexyl) phosphate. The three components were mixed at room temperature. The resulting composition had improved load-carrying and extreme pressure properties with respect to the methyl silicone oil alone, and its fire-resistance was better than that of the composition using 40% tri(2-ethyl hexyl) phosphate.

In general, a sufficient proportion of the monoalkyl diaryl phosphate will be used in the dimethyl silicone polymer fluid which will improve the lubricating properties as pointed out above and a sufficient proportion of the trialkyl phosphate will be used to render the monoalkyl diaryl phosphate soluble or compatible with the methyl silicone oil for the conditions of use. For the best fire-resistant properties, as small a proportion as possible of the trialkyl phosphate should be used.

Although the dimethyl silicone polymer fluids in the examples above have a viscosity of 20 centistokes at 100° F., the advantages of my invention may be obtained on any silicone oil, particularly the dimethyl silicone polymer, with different viscosity characteristics. The advantages of my invention may be obtained for any use to which the silicone oil may be put. Moreover, the advantages of my invention may be obtained regardless of the form in which the silicone oil is used as a lubricant, for example, in accordance with my invention, the suitable organic phosphate may be incorporated into the silicone oil used in a grease.

The compositions of my invention are useful for lubricating relatively moving frictional parts. This is done by maintaining a film of a composition of my invention between such moving parts. Among the frictional surfaces which may be lubricated with compositions of my invention are hard steel on hard steel, particularly ball bearings and gear teeth, hard steel on cast iron, particularly sliding friction therebetween, hard steel on bronze, and metal in contact with elastomer seals, particularly steel or bronze on neoprene, Buna N, butyl rubber, silastic rubber, and natural rubber. The hard steel referred to above may be chrome-plated.

I claim:

1. The normally liquid homogeneous silicone oil lubricating composition having improved lubricating and fire-resistance properties consisting essentially of liquid dimethyl silicone polymers, mono-alkyl diaryl phosphate in which the aryl groups are members of the group consisting of phenyl, cresyl and xylyl and the alkyl group has from 4 to 10 carbon atoms, and tri-alkyl phosphate in which the alkyl groups have from 4 to 10 carbon atoms, said silicone polymers having many desirable lubricating properties but being deficient in extreme pressure and load-carrying lubricating properties and incompatible with said mono-alkyl diaryl phosphate without said trialkyl phosphate, said mono-alkyl diaryl phosphate being present in a proportion sufficient to improve said lubricating properties and fire-resistance of said composition and being incompatible with said silicone polymers without said trialkyl phosphate, and said trialkyl phosphate being present in sufficient proportion to render said silicone polymers and said mono-alkyl diaryl phosphate compatible in the composition.

2. The composition as defined in claim 1 in which said mono-alkyl di-aryl phosphate is about 10% by volume of said silicone polymers, mono-alkyl di-aryl phosphate and trialkyl phosphate.

3. The composition as defined in claim 1 in which said mono-alkyl di-aryl phosphate is an octyl diphenyl phosphate.

4. The composition as defined in claim 1 in which said mono-alkyl di-aryl phosphate is 2-ethyl hexyl diphenyl phosphate.

5. The composition as defined in claim 1 in which said mono-alkyl di-aryl phosphate is an octyl dicresyl phosphate.

6. The composition as defined in claim 1 in which said mono-alkyl di-aryl phosphate is 2-ethyl hexyl dicresyl phosphate.

7. The composition as defined in claim 1 consisting essentially of the following ingredients in substantially the following proportions:

| | Volume percent |
|---|---|
| Dimethyl silicone polymer | 60 |
| 2-ethyl hexyl dicresyl phosphate | 10 |
| Tri(2-ethyl hexyl) phosphate | 30 |

8. The composition as defined in claim 1 in which said mono-alkyl di-aryl phosphate is a butyl diphenyl phosphate.

9. The composition as defined in claim 1 in which said mono-alkyl di-aryl phosphate is 6-methyl heptyl dicresyl phosphate.

10. The composition as defined in claim 1 in which said mono-alkyl di-aryl phosphate is a nonyl diphenyl phosphate.

11. The composition as defined in claim 10 in which the nonyl radical is a branched chain radical.

12. The composition as defined in claim 1 consisting essentially of the following ingredients in substantially the following proportions:

| | Volume percent |
|---|---|
| Dimethyl silicone polymer | 60 |
| Iso-nonyl diphenyl phosphate | 10 |
| Tri(2-ethyl hexyl) phosphate | 30 |

DOUGLAS H. MORETON.

REFERENCES CITED

The following references are of record in the file of this patent:

UNITED STATES PATENTS

| Number | Name | Date |
|---|---|---|
| 2,084,950 | Downing | June 22, 1937 |
| 2,237,336 | Caprio | Apr. 8, 1941 |
| 2,285,853 | Downing | June 9, 1942 |
| 2,340,331 | Knutson | Feb. 1, 1944 |
| 2,384,384 | McGregor | Sept. 4, 1945 |
| 2,406,971 | Sowa | Sept. 3, 1946 |
| 2,449,335 | Sowa | Sept. 14, 1948 |
| 2,456,642 | Merker | Dec. 21, 1948 |
| 2,467,178 | Zimmer | Apr. 12, 1949 |
| 2,471,850 | Wilcox | May 31, 1949 |

FOREIGN PATENTS

| Number | Country | Date |
|---|---|---|
| 462,556 | Great Britain | Mar. 11, 1937 |